(12) United States Patent
Webb et al.

(10) Patent No.: US 8,238,030 B2
(45) Date of Patent: Aug. 7, 2012

(54) FIBER-COUPLED COLLIMATOR FOR GENERATING MULTIPLE COLLIMATED OPTICAL BEAMS HAVING DIFFERENT WAVELENGTHS

(75) Inventors: Peter Webb, Menlo Park, CA (US); David Lande, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 18 days.

(21) Appl. No.: 12/729,187

(22) Filed: Mar. 22, 2010

(65) Prior Publication Data

US 2011/0228404 A1 Sep. 22, 2011

(51) Int. Cl.
*G02B 27/30* (2006.01)
(52) U.S. Cl. ......................................... 359/641
(58) Field of Classification Search ............. 359/641
See application file for complete search history.

(56) References Cited

U.S. PATENT DOCUMENTS

| | | | |
|---|---|---|---|
| 6,353,502 B1 * | 3/2002 | Marchant et al. | 359/626 |
| 2002/0154662 A1 * | 10/2002 | Turpin et al. | 372/20 |
| 2005/0084206 A1 * | 4/2005 | Gutin et al. | 385/24 |
| 2008/0112668 A1 * | 5/2008 | Terada et al. | 385/24 |
| 2010/0157179 A1 * | 6/2010 | Wada et al. | 349/18 |

FOREIGN PATENT DOCUMENTS

| | | |
|---|---|---|
| EP | 1294171 A2 | 3/2003 |
| JP | 2001147341 A | 5/2001 |
| JP | 2001281601 A | 10/2001 |

OTHER PUBLICATIONS

European Office Action for European Application 11 155 327.7 dated Mar. 19, 2012 (6 pages).

* cited by examiner

*Primary Examiner* — James Jones (57) ABSTRACT

An apparatus for providing multiple collimated light beams from optical fibers and the method for producing such beams. The apparatus includes first and second optical fibers that carry light of first and second wavelengths, respectively, a fixture that maintains the fibers in a fixed relationship to one another, and a collimating lens. Light from each of the first and second optical fibers diverges from a face of the fixture. The collimating lens produces first and second collimated light beams that are displaced relative to one another from the light leaving the face. The face of the fixture is positioned to correct for chromatic aberration in the lens.

14 Claims, 7 Drawing Sheets

FIBER-COUPLED COLLIMATOR FOR GENERATING MULTIPLE COLLIMATED OPTICAL BEAMS HAVING DIFFERENT WAVELENGTHS

BACKGROUND OF THE INVENTION

There are a number of optical systems in which an object is illuminated with a plurality of light beams which scan the object with light of different wavelengths and polarizations to provide information about the surface of the object. For example, in biological applications, micro-array scanners are used to scan substrates having an array of nucleic acid binding spots on the surface of the substrate after the substrate has been exposed to a solution of interest that contains nucleic acid that is complementary to one or more of the nucleic acid on the substrate. Two or more fluorescent dyes are used to "stain" the spots. The dyes are excited to different degrees depending on the wavelength of light that is directed to the spots. Any given spot may be stained with one, two, or none of the dyes. To measure the quantity of dye at each spot, the spot is illuminated with light that excites the dye and the intensity of light generated by the spot at a predetermined wavelength corresponding to that dye is measured.

To improve the detection efficiency, the intensity of the light emitted from each spot at two different wavelengths when excited by each of the two different excitation wavelengths is measured. In one type of system, the substrate is scanned separately by two different light beams, each light beam having a different wavelength. The intensity of light emitted by the dyes in each spot is measured. The spots on the substrate are on the order of microns and are closely packed; hence, the scanning spots must be on the order of microns.

SUMMARY OF THE INVENTION

The present invention includes an apparatus for providing multiple collimated light beams from optical fibers and the method for producing such beams. The apparatus includes first and second optical fibers that carry light of first and second wavelengths, respectively, a fixture that maintains the fibers in a fixed relationship to one another, and a collimating lens. Light from each of the first and second optical fibers diverges from a face of the fixture. The collimating lens produces first and second collimated light beams that are displaced relative to one another from the light leaving the face.

In one aspect of the invention, the collimating lens has a first focal length for light of the first wavelength and a second focal length for light of the second wavelength, the first focal length being different from the second focal length. The first optical fiber terminates at a first distance from the collimating lens equal to the first focal length, and the second optical fiber terminates at a second distance collimating from the lens equal to the second focal length.

In another aspect of the invention, the first and second optical fibers terminate on a face of the fixture. The face is angled with respect to the collimating lens such that the first and second distances differ by an amount that is substantially equal to the difference in the first and second focal lengths.

DETAILED DESCRIPTION OF THE PREFERRED EMBODIMENTS OF THE INVENTION

Figure 1:
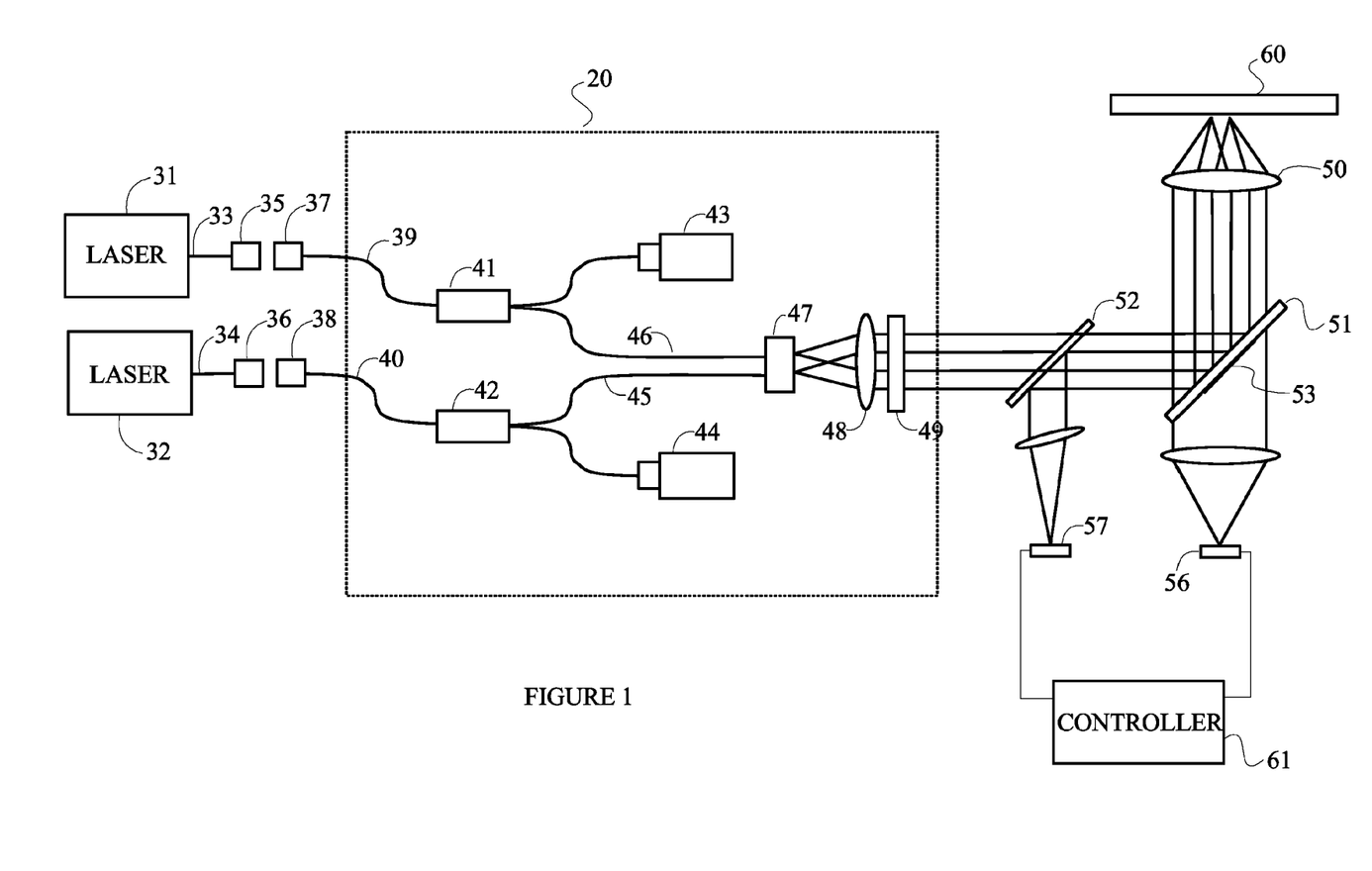
FIG. 1 illustrates a scanning system that utilizes a light source according to one embodiment of the present invention.

The manner in which the present invention provides its advantages can be more easily understood with reference to FIG. 1, which illustrates a scanning system that utilizes a light source according to one embodiment of the present invention. Light source 20 is powered by two lasers shown at 31 and 32, the light emitted from laser 31 having a different wavelength than the light emitted from laser 32. The lasers are coupled to light source 20 by polarization preserving fibers 33 and 34 that terminate in couplers 35 and 36, respectively. Couplers 35 and 36 mate with couplers 37 and 38, respectively, that convey the optical signals through polarization maintaining fibers 39 and 40, respectively.

The light output of light sources 31 and 32 is measured by photodetectors 43 and 44, respectively, by diverting a fixed portion of the light to the photodetectors using beam splitters 41 and 42. The beam splitters typically divert 1% of the power for these measurements. These measurements allow controller 61 to correct for differences in intensity of the light emitted from the lasers. To simplify the drawing, the connections between photodetectors 43 and 44 and controller 61 have been omitted. It should also be noted that the beam splitters and photodetectors are optional.

The remaining light from each beam splitter is coupled to a mounting fixture 47 through fibers 45 and 46, which are also polarization-preserving fibers. Fixture 47 maintains the fibers in a precise relationship to one another such that the light leaving the fibers appears to be two point sources offset from one another with respect to collimating lens 48. Collimating lens 48 is positioned to generate a collimated beam from each light source. The two collimated beams are offset and angled with respect to one another. The width of the collimated beams depends on the focal length of lens 48 and the angle at which the light leaving the optical fibers diverges.

The two collimated beams are directed to focusing lens 50 by mirror 53 that is mounted on transparent plate 51. Focusing lens 50 converts the two collimated beams to two separated spots on a substrate 60 that is being scanned. The separation of the spots is determined by the focal lengths of lenses 48 and 50 and the offset of fibers 45 and 46 in fixture 47. In one aspect of the invention, the separation of the spots is chosen such that cross-talk between the two fluorescent "images" generated by scanning the surface of the substrate is substantially reduced.

The light from substrate 60 is directed to detectors 56 and 57 that provide the signals used in analyzing the surface of substrate 60. The portion of the return light that is blocked from detector 56 is directed to detector 57 by partially reflecting mirror 52. Mirror 53 can be a dichroic reflector that reflects at the illumination wavelengths, while passing light at the fluorescent wavelengths. Detector 57 is utilized to maintain the focus of the light spots on substrate 60.

In one aspect of the invention, an optional filter 49 is included to reject light at undesired wavelengths. For example, if a red diode laser is used as the red light source, the output of the laser can include a significant amount of lower wavelength light that will reach the substrate and fluorescent detection system. Filter 49 can be used to block this light, and hence, eliminate this background source.

Figure 2:
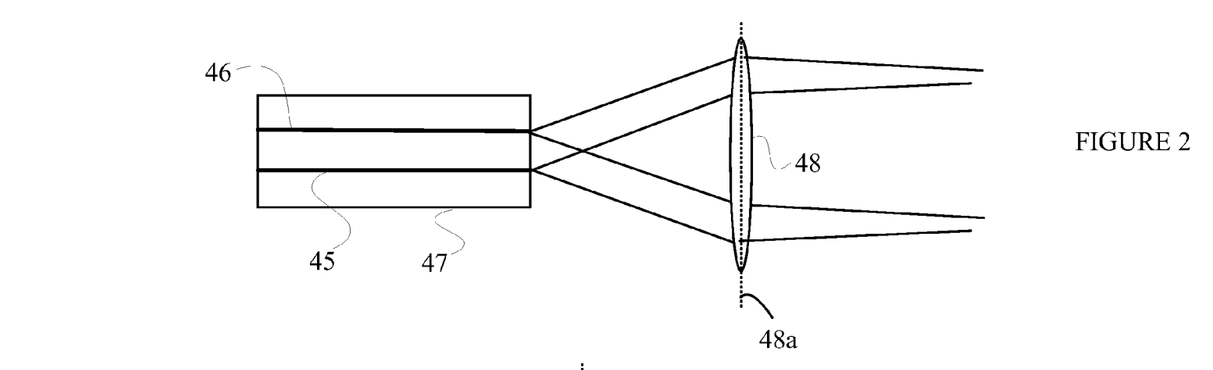
FIG. 2 is a cross-sectional view of fixture 47 and lens 48.

The collimation of the two light beams depends on the proper placement of the ends of fibers 45 and 46 in fixture 47 relative to collimating lens 48. Refer now to FIG. 2, which is a cross-sectional view of fixture 47 and lens 48. Ideally, fibers 45 and 46 are immobilized within fixture 47 such that the end of each fiber is at a distance equal to the focal length of lens 48. If lens 48 does not suffer from chromatic aberration, the focal length of lens 48 will be the same for the light carried by each fiber even though the light leaving fiber 45 differs in wavelength significantly from that leaving fiber 46. In this case, the arrangement shown in FIG. 2 provides the correct alignment. The distance from the end of fiber 45 to plane 48a of lens 48 is the same as the distance from the end of fiber 46 to the plane 48a.

Figure 3:
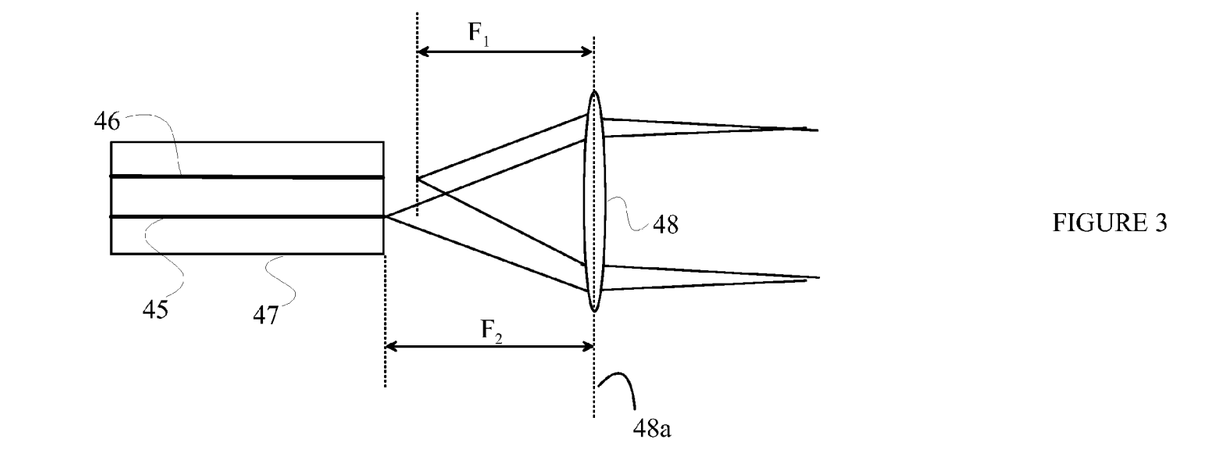
FIG. 3 illustrates the case in which the collimating lens suffers from chromatic aberration.

If, however, lens 48 suffers from chromatic aberration, the focal length of lens 48 for light of the wavelength leaving fiber 45 will be different from the focal length of lens 48 for light leaving fiber 46 as shown in FIG. 3, which illustrates the case in which the collimating lens suffers from chromatic aberration. If fixture 47 is positioned such that the end of fiber 45 is positioned at the correct distance, $F_2$, as shown in FIG. 3, then the end of fiber 46 will no longer be positioned at the proper distance, $F_1$, from plane 48a. In this case, the light beam from fiber 46 will not be properly collimated.

The cost of a lens that compensates for chromatic aberration is significantly higher than the cost of a lens that lacks such compensation. Hence, it is advantageous to provide an arrangement in which such chromatic compensation is not required.

Figure 4:
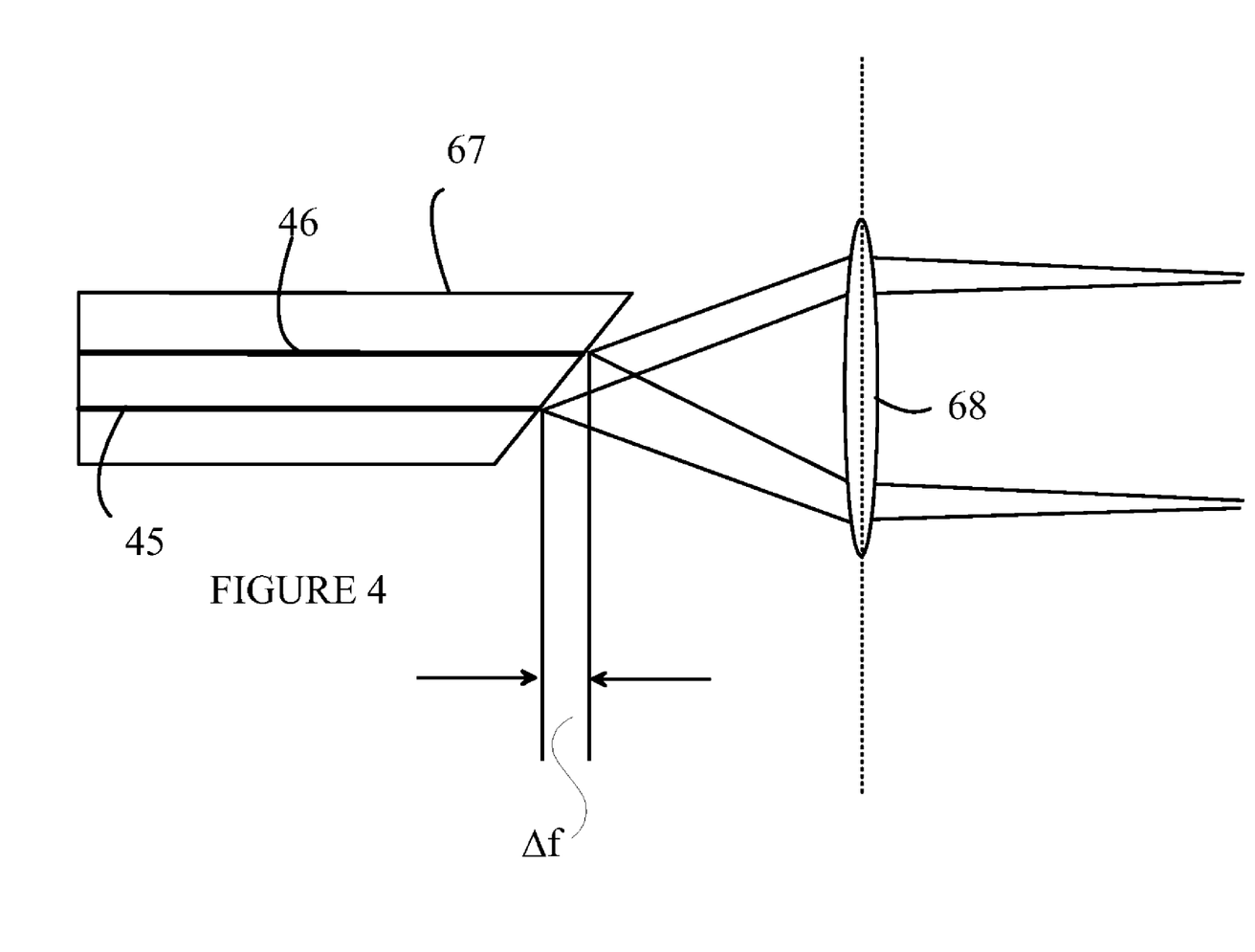
FIG. 4 illustrates a mounting fixture according to one embodiment of the present invention.

Refer now to FIG. 4, which illustrates a mounting fixture according to one embodiment of the present invention. Mounting fixture 67 immobilizes fibers 45 and 46 both in terms of position and orientation in the case of polarization preserving fibers. The end of mounting fixture 67 from which light emerges is cut at an angle such that the difference in exit position of light leaving fibers 45 and 46 is equal to the difference, Δf, in the focal length of lens 68 for the two wavelengths in question.

Figure 5:
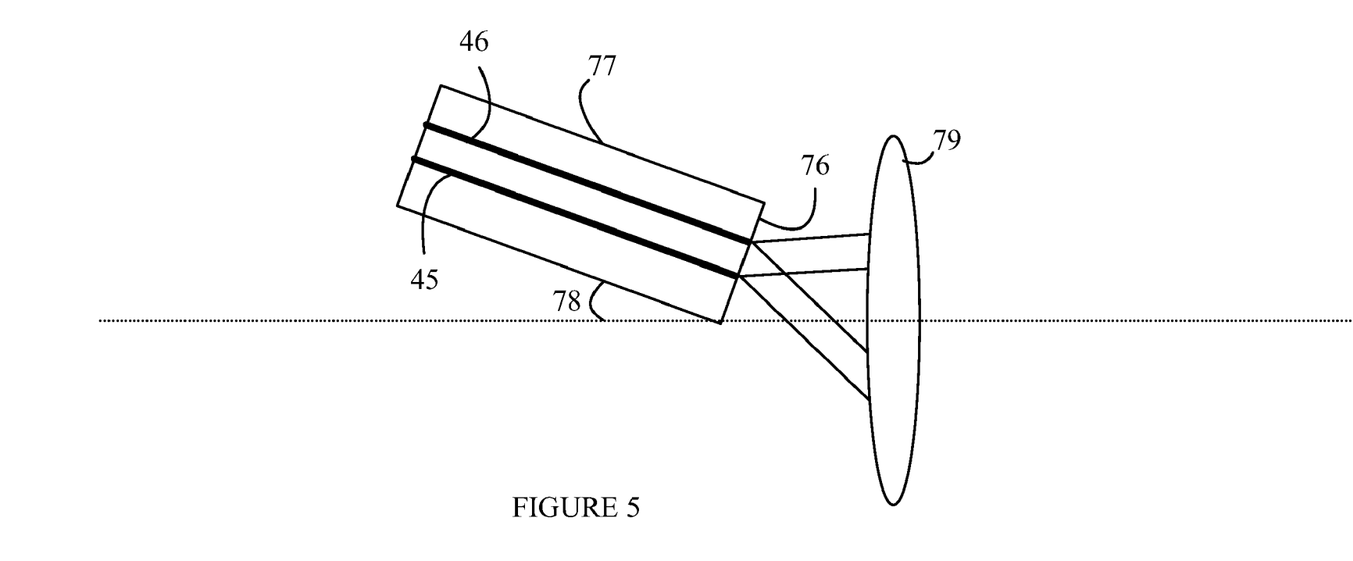
FIG. 5 illustrates a mounting fixture arrangement according to another embodiment of the present invention.

The difference in exit distance between the ends of the fibers and the collimating lens can be achieved by a number of methods. In the above-example, the difference was achieved by cutting the mounting fixture end at an angle. Refer now to FIG. 5, which illustrates a mounting fixture arrangement according to another embodiment of the present invention. Mounting fixture 77 has a square-faced end 76. The entire mounting fixture is tilted at an angle 78 with respect to the optical axis of collimating lens 79 such that the end of fiber 45 is positioned further from lens 79 than the end of fiber 46 to compensate for the chromatic aberration of lens 79.

It should be noted that a combination of the strategies shown in FIGS. 4 and 5 could also be utilized to further increase the differential distance between the ends of the fibers and the collimating lens. In such an arrangement, a mounting fixture with a slanted end such as shown in FIG. 4 would be mounted such that the fibers are at an angle with respect to the optical axis of the lens.

In one aspect of the invention, a mounting fixture for use in the present invention is constructed by immobilizing the fibers in a fixture that maintains the desired spacing and fiber orientation if polarization-preserving fibers are utilized. The fibers are then fixed in place in the mounting fixture utilizing an appropriate adhesive or potting compound. After the adhesive or potting compound has cured, the end of the fixture is cut to the desired angle and polished.

Figure 6:
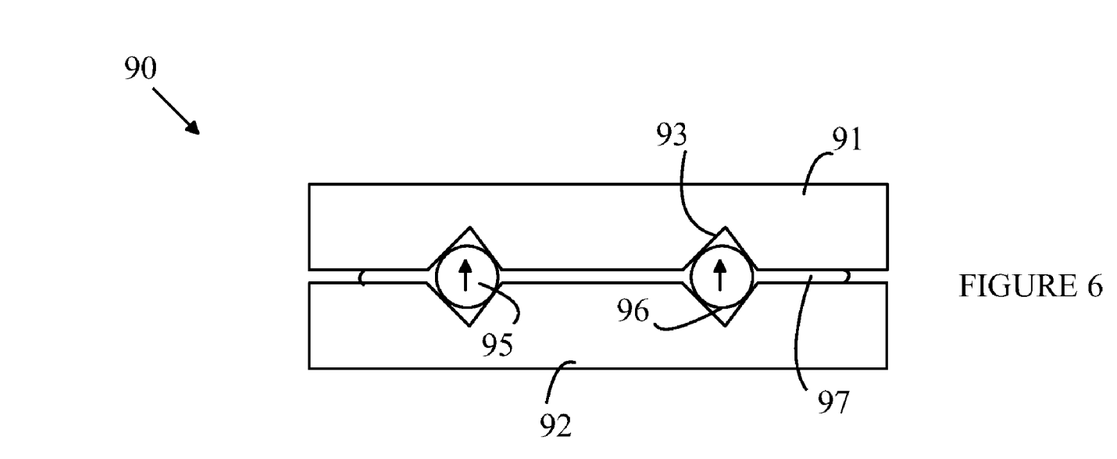
FIG. 6 is a cross-sectional view of mounting fixture 90 through line 6-6 shown in FIG. 7.
Figure 7:
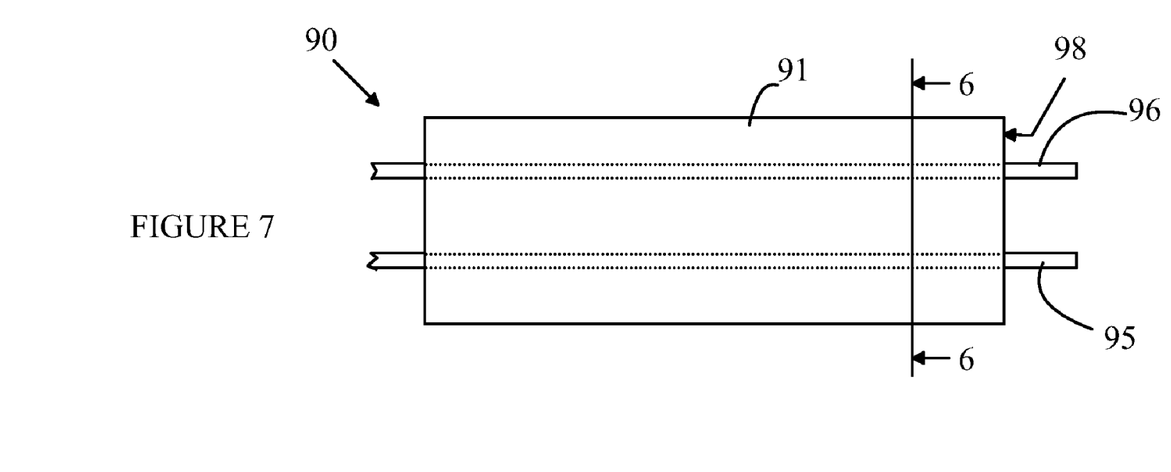
FIG. 7 is a top view of mounting fixture 90 after the fibers have been cemented in place.

Refer now to FIGS. 6 and 7, which illustrate the fabrication of one embodiment of a mounting fixture for use in the present invention. FIG. 6 is a cross-sectional view of mounting fixture 90 through line 6-6 shown in FIG. 7. FIG. 7 is a top view of mounting fixture 90 after the fibers have been cemented in place. Mounting fixture 90 is constructed from two planar plates 91 and 92. Each plate has a V-shaped grove 93 for registering the fibers at the correct spacing with respect to one another. In the example shown in the drawings, fibers 95 and 96 are polarization-preserving fibers. The orientation of the fibers is maintained by a separate fixture that has been omitted from the drawings. After the adhesive layer 97 has cured, face 98 of mounting fixture 90 is cut to the correct angle to remove any excess fibers that extend beyond the face of the mounting fixture. The cut end is then polished to provide the final surface for use in the present invention.

The two-plate fixture shown in FIGS. 6 and 7 can also be used to hold the fibers in the correct alignment during bonding to another fixture. In this case, the plates are clamped together after the fibers have been placed in the groves and turned to the desired orientation.

Figure 8:
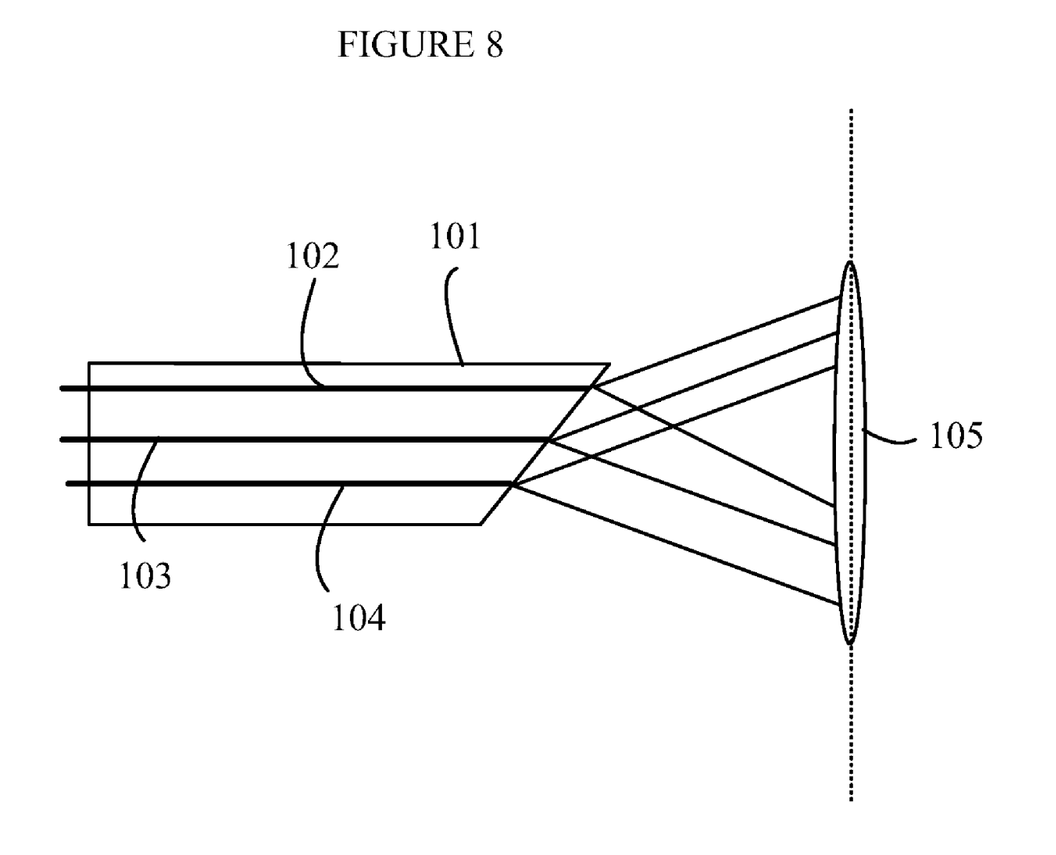
FIG. 8 is a cross-sectional view of another embodiment of a collimating lens arrangement according to the present invention.

The above-described embodiments of the present invention provide two collimated beams with different wavelength that are offset with respect to one another. However, embodiments having more than two such beams can also be constructed. A single polished face set at an angle to the collimating lens can still be used to compensate for the chromatic aberration at the three different wavelengths by adjusting the spacing of the fibers relative to one another. Refer now to FIG. 8, which is a cross-sectional view of another embodiment of a collimating lens arrangement according to the present invention. Fixture 101 accommodates three optical fibers 102-104. Each fiber is positioned to provide collimation for a corresponding wavelength of light. The end face of fixture 101 is cut at an angle such that the end of each fiber is located at a distance equal to the focal length of lens 105 at the wavelength of light corresponding to that fiber. The distances between the fibers in fixture 101 are adjusted accordingly to provide the desired separation between the fiber ends and collimating lens 105. That is, the distance between fiber 102 and fiber 103 may be different from the distance between fiber 103 and fiber 104.

There are applications in which the spacing of the fibers in the fixture is dictated by other system constraints. For example, the relative spacing of the final light spots in a scanner such as that shown in FIG. 1 is determined by the relative spacing of the fibers in the fixture. In this case, the differences in the focal length as a function of wavelength can be accommodated by polishing the face of the fixture through which the light exits to have multiple facets at different angles.

Figure 9:
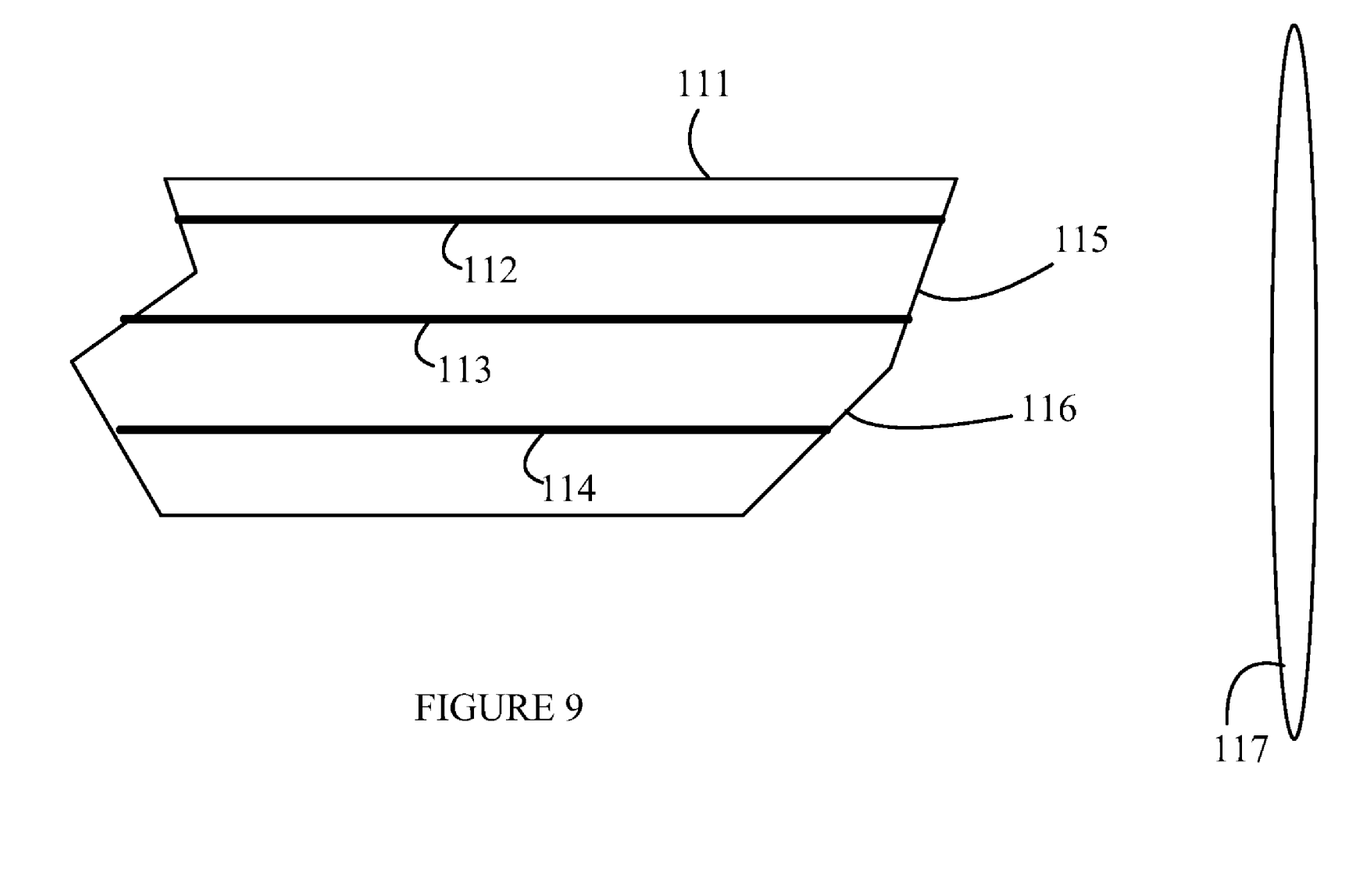
FIG. 9 is a cross-sectional view of another embodiment of a fixture and lens arrangement that can be utilized in the present invention.

Refer now to FIG. 9, which is a cross-sectional view of another embodiment of a fixture and lens arrangement that can be utilized in the present invention. Fixture 111 immobilizes three fibers 112-114 whose relative positions are dictated by other design considerations. In this case, the focal length of lens 117 for light of the wavelength being carried by fiber 114 is too great to be accommodated by continuing the polishing angle used to generate face 115. To accommodate the longer focal length, a portion of the exit face is polished at a second angle to produce the face shown at 116.

The above-described embodiments of the present invention utilize fibers that carry light in a narrow band of wavelengths. The present invention will function as described if the bandwidth of the light exiting each fiber is sufficiently narrow to assure that the focal length of the collimating lens does not vary significantly over that band. The amount of variation that is allowed will depend on the degree of collimation that is required by the particular application.

The above-described embodiments utilize polarization-preserving fibers in fixture 47. While the use of such fibers is optional, polarization control is desirable in applications in which the signal being detected by the device utilizing a light source according to the present invention is small. The amplitude of reflected light at the substrate shown in FIG. 1 can vary with the polarization of the incident light beams. Hence, changes in polarization of the incoming light beams can lead to changes in intensity in the reflected light, which is a source of background noise in fluorescent applications. The use of polarization-preserving fibers substantially reduces this type of variable background signal.

The above-described embodiments of the present invention and Summary of the Invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
    first and second optical fibers that receive light from first and second light sources, respectively, said light from said first and second light sources being characterized by first and second wavelengths, respectively, said first wavelength being different from said second wavelength;
    a fixture that maintains said first and second optical fibers in a fixed relationship with respect to one another, light from each of said first and second optical fibers diverging from said fixture, said relationship being characterized by a spacing of said fibers on a face of said fixture; and
    a collimating lens that generates first and second collimated non-coincident light beams from said light leaving said face, wherein said collimating lens has a first focal length for light of said first wavelength and a second focal length for light of said second wavelength,
    wherein said first optical fiber terminates at a first distance from said collimating lens, wherein said first distance equals to said first focal length,
    wherein said second optical fiber terminates at a second distance from said collimating lens, wherein said second distance equals to said second focal length.

2. The apparatus of claim 1 further comprising a focusing element that focuses said first and second collimated non-coincident light beams to first and second spots on a surface.

3. The apparatus of claim 2 further comprising a light collection system that measures light emitted by each of said spots on said surface.

4. The apparatus of claim 1 further comprising an optical filter that removes light outside of said first and second wavelengths from said first and second collimated non-coincident light beams.

5. The apparatus of claim 1 wherein said first and second collimated non-coincident light beams travel in non-parallel directions with respect to one another.

6. The apparatus of claim 1 further comprising first and second beam splitters, each beam splitter receiving a light signal on an input thereto and splitting that light signal to a light signal that is coupled to a corresponding one of said first and second optical fibers and a monitor light signal that is coupled to a photodetector.

7. The apparatus of claim 1 further comprising first and second ports that include couplings for optical fibers, said first port receiving light that is coupled to said first optical fiber and said second port receiving light that is coupled to said second optical fiber.

8. The apparatus of claim 7 wherein said first focal length being different from said second focal length.

9. The apparatus of claim 8 wherein said first and second optical fibers terminate on said face of said fixture and wherein said face is angled with respect to said collimating lens such that said first and second distances differ by an amount that is substantially equal to a difference in said first and second focal lengths.

10. The apparatus of claim 1 wherein said first and second optical fibers are polarization-preserving optical fibers.

11. The apparatus of claim 8 further comprising a third optical fiber that receives light from a third light source characterized by a third wavelength that is different from said first and second wavelengths, said collimating lens having a third focal length for said third wavelength that is different from said first and second focal lengths, said fixture maintaining an end of said third optical fiber at a distance from said collimating lens substantially equal to said third focal length.

12. A method for generating first and second collimated optical beams of different wavelengths, said first and second optical beams being displaced from one another, said method comprising:
    providing first and second optical fibers that receive light from first and second light sources, respectively, said light from said first and second light sources being characterized by first and second wavelengths, respectively, said first wavelength being different from said second wavelength;
    positioning said optical fibers in a fixture that maintains said first and second optical fibers in a fixed relationship with respect to one another, light from each of said first and second optical fibers diverging from said fixture, said relationship being characterized by a spacing of said fibers on said face; and
    providing a collimating lens that generates first and second collimated light beams from said light leaving said face, said first collimated light beam traveling in a direction different from that of said second collimated light beam, wherein said collimating lens has a first focal length for light of said first wavelength and a second focal length for light of said second wavelength,
    wherein said first optical fiber terminates at a first distance from said collimating lens, wherein said first distance equals to said first focal length, and
    wherein said second optical fiber terminates at a second distance from said collimating lens, wherein said second distance equals to said second focal length.

13. The method of claim 12 wherein said first focal length being different from said second focal length.

14. The method of claim 13 further comprising generating a third collimated beam from a third light source characterized by a third wavelength that is different from said first and second wavelengths, said collimating lens having a third focal length for said third wavelength that is different from said first and second focal lengths by maintaining an end of a third optical fiber at a distance from said collimating lens substantially equal to said third focal length.

\* \* \* \* \*